H. H. BAKER.
Hoe.
No. 25,619.
Patented Oct. 4, 1859.
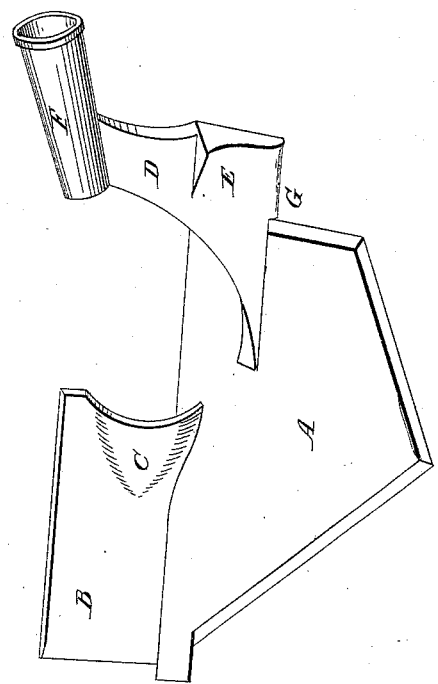
Witnesses:
Inventor.

UNITED STATES PATENT OFFICE.

H. H. BAKER, OF NEW MARKET, NEW JERSEY.

IMPROVEMENT IN WEEDING-HOES.

Specification forming part of Letters Patent No. 25,619, dated October 4, 1859.

*To all whom it may concern:*

Be it known that I, H. H. BAKER, of New Market, in the county of Middlesex and State of New Jersey, have invented a new and useful Implement of Agriculture called a "Drill-Weeder;" and I do hereby declare that the following is a full and exact description thereof, reference being had to the accompanying drawing, and to the letters of reference marked thereon.

The nature of my invention consists in so constructing or forming an implement for cutting or dressing the weeds from plants growing in drills as to avoid the reciprocating or shuffling motion, and thus enable me to proceed rapidly, as on a common walk, without in the least endangering the plants, and removing from them any lumps of dirt or pebbles and delivering next the plants a layer of fine soil, leaving the surface near the plant flat as before, and at the same time forming a channel or subsoil-groove at a given distance from the plants, for the purpose of admitting moisture and air into the soil around the roots.

To enable others to make and use my invention, I will proceed to describe its construction and operation.

A is a piece of rolled steel of a thickness to correspond with the size desired, and cut to a proper shape. The edges for cutting are then prepared, when it is ready for bending and shaping the piece B. The piece B is attached to A, and stands at right angles. The front end is brought to an edge, the top kept straight and parallel with the side of A, while the bottom part of the rear end is bent inward and made convex near the middle, as shown at C.

To the plate A, I attach, by welding or riveting, a standard, D, formed of malleable or other iron, having a concave cutting-edge in front. On one side of this standard I place a concave surface, having that part thickened for that purpose, as shown at E. The bottom part back of plate A drops below, as shown at G. To the top of this standard I attach the ferrule F, to receive the handle. The plate A has its cutting-edges at such angles as are shown in the drawing.

The operation of my implement is as follows: I place it in the soil from one to one and a half inch deep. The peculiar shape of piece A holds it steady in the soil and gives it an easy cut. The top edge of piece B forms a guide, so that I can see the nearness of approach to the plants. The end bent inward removes the soil a little distance from the plants, while the convex form near the end removes at surface the coarser soil and prevents its falling on the plants and injuring them, while at the bottom it allows the finer soil to approach the plants. The standard D, having a sharp edge in front, easily divides the soil; but being thicker on the back, it presses apart the soil and opens a channel to the depth of cut of the weeder. The concave form, as shown at E, is to press the soil a little oval and harder on the side opposite to the plants, to prevent the channel filling up readily, thus making it certain to receive the rain and deposit it around the roots of the plants instead of allowing it to pass to the center between the drills and beyond any immediate benefit.

The piece A, having cutting-edges on all sides but one, allows it to be used reciprocally with great effect, if desired; but its general use is only in one direction parallel with the plants in the drill, and that at the speed of a common walk.

What I claim as my invention, and desire to secure by Letters Patent, is—

The arrangement of the piece B, standard D, plate A, concave E, and ferrule F, as described, as and for the purposes substantially as above set forth.

H. H. BAKER.

Witnesses:
ISRAEL R. CORIELL, Jr.,
N. VARS.